United States Patent

Echegaray et al.

[11] Patent Number: 6,165,435
[45] Date of Patent: Dec. 26, 2000

[54] METHOD AND PRODUCTION OF NITRIC ACID

[75] Inventors: Diego Fernandez Echegaray; Antonio Augusto M. Velloso, both of Salvador, Brazil; Matthew Lincoln Wagner, White Plains, N.Y.

[73] Assignee: Praxair Technology, Inc., Danbury, Conn.

[21] Appl. No.: 09/220,818

[22] Filed: Dec. 24, 1998

[51] Int. Cl.⁷ ............................................. C01B 21/40
[52] U.S. Cl. ..................................... 423/392; 423/393
[58] Field of Search ................................ 423/392, 393

[56] References Cited

U.S. PATENT DOCUMENTS

| | | | |
|---|---|---|---|
| 4,183,906 | 1/1980 | Watson et al. | 423/392 |
| 4,235,858 | 11/1980 | Blakey et al. | 423/393 |
| 4,867,918 | 9/1989 | Kiyonaga et al. | 261/76 |
| 4,908,471 | 3/1990 | Leuck et al. | 560/77 |
| 4,931,225 | 6/1990 | Cheng | 261/76 |
| 5,061,406 | 10/1991 | Cheng | 261/76 |
| 5,108,662 | 4/1992 | Litz et al. | 261/16 |
| 5,167,935 | 12/1992 | Lerner | 422/172 |
| 5,302,325 | 4/1994 | Cheng | 261/76 |
| 5,356,600 | 10/1994 | Kiyoaga et al. | 422/234 |
| 5,985,230 | 11/1999 | Vlaming et al. | 423/392 |

FOREIGN PATENT DOCUMENTS

| | | |
|---|---|---|
| 0799794A1 | 10/1997 | European Pat. Off. . |
| 0808797A2 | 11/1997 | European Pat. Off. . |
| 0808797A3 | 2/1998 | European Pat. Off. . |
| 803211 | 10/1958 | United Kingdom ................ 423/392 |

OTHER PUBLICATIONS

E. Faried, et al, "Boosting Existing Nitric Acid Production", *The Fertiliser Society*, Oct. 16, 1986.

Gunnar Kongshaug, "ANEXO IV: Extension of Nitric Acid Plant capacity By use of oxygen", *2nd Uhde, Nitric Acid Symposium*, Sep. 21–23, 1981.

*Primary Examiner*—Wayne Langel
*Attorney, Agent, or Firm*—Bernard Lau

[57] ABSTRACT

A process is described for producing nitric acid involving oxidizing ammonia gas to form dinitrogen tetroxide gas, reacting the dinitrogen tetroxide with water in an absorption zone to form aqueous nitric acid and nitric oxide gas, removing a nitric acid/nitric oxide stream from the absorption zone and feeding the stream into a nitric acid bleaching zone, removing impurities from the nitric acid in the bleaching zone to form nitric acid product and adding supplemental oxygen gas to one or more of the reaction streams to increase nitric acid production and or strength. The improvement involves injecting the supplemental oxygen into a nitric acid-containing process stream to form a gas bubble/liquid mixture in the stream, the mixture forming a fine dispersion of gas bubbles having diameters of less than about 0.1 mm. According to the invention, increased interfacial surface is created between the gas bubbles and the liquid mixture to facilitate removal of impurities from the liquid phase and shifting of the reaction.

7 Claims, 4 Drawing Sheets

METHOD AND PRODUCTION OF NITRIC ACID

FIELD OF THE INVENTION

This invention relates to a process for the production of nitric acid, and in particular to a method for removing impurities that are produced in that process, and for increasing nitric acid production or lowering supplemental oxygen requirements.

BACKGROUND OF THE INVENTION

Commercial production of nitric acid is based on the ninety year old Ostwald process, and can be broken down into three major process steps:

I: Ammonia Oxidation $$4\ HN_3(g) + 5\ O_2(g) \rightarrow 4\ NO(g) + 6\ H_2O(g) \tag{1}$$

II: Nitric Oxide Oxidation and Nitrogen Dioxide Dimerization $$2\ NO(g) + O_2(g) \rightarrow 2\ NO_2(g) \tag{2}$$

$$2\ NO_2(g) \rightarrow N_2O_4(g) \tag{3}$$

and

III: Dinitrogen Tetroxide Absorption $$3\ N_2O_4(g) + 2\ H_2O(l) \rightarrow 4\ HNO_3(aq) + 2\ NO(g) \tag{4}$$

The overall stoichiometry for the above reactions is given by the following formula:

$$NH_3 + 2\ O_2 \rightarrow HNO_3 + H_2O \tag{5}$$

These reactions are performed in four major process units: an ammonia converter, a cooler and condenser apparatus ("cooler/condenser apparatus"), an absorption tower, and a bleacher. These units, along with equipment used for tail gas treatment, form the major units operating in a modern nitric acid plant. Other equipment includes piping or other means through which raw materials (including air) are routed, including piping carrying liquid that contains nitric acid.

A simplified process flow diagram showing the process units of a conventional nitric acid plant is shown in FIG. 1. Ammonia oxidation occurs exclusively in the ammonia converter 5. Typically, this reaction is catalytic and occurs over a platinum containing wire gauze, although a small number of plants use a cobalt based pelletized catalyst. Air 1a and ammonia 2 are premixed and in some cases preheated before being routed to the converter 5. The concentration of ammonia in the converter feed is generally held to between 9 and 11%. The desired reaction taking place in the converter is reaction (1). Important competing reactions, however, are:

$$2\ NO(g) \rightarrow N_2(g) + O_2(g) \tag{6}$$

and $$4\ NH_3(g) + 6\ NO(g) \rightarrow 5\ N_2(g) + 6\ H_2O(g) \tag{7}$$

Ammonia oxidation is performed commercially at pressures ranging from 1 to 10 atmospheres and temperatures ranging from 1500 to 1700° F. The choice of operating pressures is based primarily on downstream considerations, with most plants operating at about 10 atmospheres. The operating temperature is chosen, in part, by balancing nitric oxide yield, which increases with increasing temperature, and catalyst loss which also increases with increasing temperature. Most converters are operated at a temperature near 1650° F.

The molar yield of nitric oxide formed from ammonia is generally near 95%, but varies depending on the reaction conditions employed. In particular, while approximately 100% ammonia is converted to other products, the yield of nitric oxide is lower than 100% because of competing reactions (6) and (7). Temperature, converter configuration, flow velocity, and the ratio of oxygen to ammonia in gas entering the converter affect the yield of nitric oxide.

The nitric oxide formed in the converter 5 must be converted into dinitrogen tetroxide to produce nitric acid in the absorption tower 15. This is done by first allowing the nitric oxide to react with the excess oxygen between the ammonia converter 5 and the absorption tower 15 to form nitrogen dioxide. The nitrogen dioxide is then allowed to dimerize to form dinitrogen tetroxide. These reactions occur primarily within the cooler/condenser apparatus.

Process equipment other than the cooler/condenser apparatus is present between the ammonia converter 5 and the absorption tower 15. This equipment may include, but is not limited to, a waste heat boiler, an economizer, a platinum filter, and piping or other means to connect these to each other and/or the converter 5 and the absorption tower 15. The combination of this equipment and the cooler/condenser apparatus is referred to herein as the "cooler/condenser train" 10.

The cooler/condenser apparatus is essentially a heat exchanger and a phase separator. Removing heat in the cooler/condenser promotes both phase separation and the oxidation of nitric oxide (per equation (9) below). The effect of temperature is particularly important in the cooler/condenser because the oxidation of nitric acid is a surprisingly slow homogeneous gas phase reaction with a rate which slows with increasing temperature. The phase separator condenses and removes water formed in the converter. The condensed water generally contains up to 50 wt. % nitric acid as a result of absorption of dinitrogen tetroxide (per reaction (4)). This weak acid solution 12 is normally pumped to the middle of the absorption tower 15.

Some plants route additional air through line 1c, shown in phantom, to the cooler/condenser train 10 to increase the oxygen partial pressure in the cooler and condenser apparatus.

Because operating conditions in the cooler/condenser are not normally at equilibrium, the rate of nitrogen dioxide formation can be calculated according to the following formula (the reverse reaction of reaction (2) can generally be ignored):

$$dP_{NO2}/dt = k(P_{NO})^2(P_{O2}) \tag{8}$$

where the rate constant, k, as a function of temperature (in degrees Kelvin) is given as:

$$k = 10^{(641/T) - (0.725)} \tag{9}$$

From equation (8), it is evident that high oxygen partial pressures increase the rate of reaction (2), reducing the volume necessary to oxidize a given amount of nitric oxide in the cooler/condenser. Because of this, nitric acid plants are normally run at medium to high pressures (e.g., about 3–10 atm.). Some plants also route additional air to the cooler condenser to increase oxygen partial pressure.

The dinitrogen tetroxide rich process gas 11 from the cooler/condenser is then contacted with water 13 in an absorption tower 15. Typically, the absorption tower is strayed, although packed towers are sometimes used. Normally, water 13 enters at the top of the absorption tower, weak acid 12 produced in the cooler/condenser apparatus enters in the middle of the tower, and process gas 11 in combination with additional air (usually referred to as secondary air) enters the absorption tower 15 near its bottom via line 17. The secondary air is provided by line 1b and is routed first through the bleacher 20. Air may also be provided directly to the absorber 15 through air line 1d. The product acid 16 is withdrawn from the bottom and a NOx containing vent gas ("tail gas") 14 exits from the top.

In the absorption tower, the dinitrogen tetroxide is reactively absorbed in the water and forms nitric acid. This reactive absorption is generally represented as reaction (4). However, the actual mechanism is thought to be:

$$N_2O_4(g) \rightarrow N_2O_4(l) \qquad (10)$$

$$N_2O_4(l) + H_2O(l) \rightarrow HNO_3(l) + HNO_2(l) \qquad (11)$$

The nitrous acid (HNO$_2$) produced in reaction (11) either decomposes or oxidizes to form nitric acid:

$$3\ HNO_2(l) \rightarrow HNO_3(l) + H_2O(l) + 2\ NO(g) \qquad (12)$$

$$2\ HNO_2(l) + O_2(l) \rightarrow 2\ HNO_3(l) \qquad (13)$$

Additional nitrous acid is also formed by the absorption of dinitrogen trioxide, which is in turn produced in small quantities from the reaction of nitric oxide and nitrogen oxide, according to the following reactions.

$$NO(g) + NO_2(g) \rightarrow N_2O_3(g) \qquad (14)$$

$$N_2O_3(g) \rightarrow N_2O_3(l) \qquad (15)$$

$$N_2O_3(l) + H_2O(l) \rightarrow 2\ HNO_2(l) \qquad (16)$$

Although usually a minor reaction, nitrogen dioxide can also be adsorbed according to the following reactions:

$$NO_2(g) \rightarrow NO_2(l) \qquad (17)$$

$$2\ NO_2(l) + H_2O(l) \rightarrow HNO_3(l) + HNO_2(l) \qquad (18)$$

If the nitric oxide formed in reaction (12) is not reoxidized through reaction (2), it passes out of the tower in the tail gas. Loss of nitric oxide in this fashion reduces nitric acid yield and leads to higher emissions of NOx from the plant. Because NOx emissions are normally highly regulated, it is advantageous to reoxidize as much nitric oxide as possible.

Reoxidation of some of the nitric oxide occurs in spaces between the absorption tower trays. In a conventional plant, secondary air via line 17, and sometimes via line 1d (shown in phantom) are added to the absorption tower to increase the rate of reoxidation. By increasing the oxygen partial pressure, the secondary air also promotes reaction (13).

The nitric acid 16 removed from the base of the absorption tower typically contains dissolved unreacted dinitrogen tetroxide, nitrous acid, dinitrogen trioxide, and nitrogen dioxide. These impurities discolor the nitric acid, imparting a yellow color. The yellow color is caused by dissolved dinitrogen tetroxide and nitrogen dioxide. Nitrous acid and dinitrogen trioxide impart a blue color (which mixes with the yellow to form a green solution). A nitric acid and water mixture that lacks these impurities is clear, and is referred to as "water white".

These impurities can interfere with normal uses of nitric acid, particularly chemical syntheses, and must be removed. Since the removal of the impurities reduces the yellow color, this process step is known as bleaching.

To remove the impurities, the nitric acid is contacted in a countercurrent manner with an ascending stream of air provided to the bleacher 20 via line 1b. The bleacher is a strayed or packed tower that is normally either a separate unit from the absorption tower, or is formed by the bottom few trays of the absorption tower. (A combination of bleacher trays within the absorption tower and a separate bleacher tower is sometimes employed.)

The ascending stream of air in the bleacher physically strips the dissolved gases from the acid and chemically oxidizes the impurities. The two oxidation reactions which remove impurities are reactions (13) and (2). Reaction (13) removes unwanted color in the product by removing nitrous acid. Reaction (2) also removes nitrous acid by removing nitric oxide, thereby shifting reaction (12) to the right. The nitric acid 21 removed from the bleacher 20 is usually ready to be sold or consumed on site.

The air and NOx (collectively 17) exiting the bleacher are routed back to the absorption tower 15. This increases the oxygen partial pressure in the absorption tower and allows the NOx components stripped in the bleacher to be absorbed and form nitric acid.

The tail gas 14 contains significant amounts of NOx and, to conform to conventional environmental regulations, must be treated before being vented to the atmosphere. Currently in the United States, emissions from newly constructed nitric acid plants must be limited to 1.5 kg NOx per metric ton of acid (100% basis), which is equivalent to 230 ppm. To achieve this level of emissions, three abatement methods are conventionally used: absorption, adsorption, and catalytic reduction.

In the absorption process for abating NOx, tail gases are passed through one or more absorbers containing water or a solution of ammonia, urea, or sodium hydroxide. Where water is used, a weak acid solution is formed in the absorption process, which is recycled. Using other absorbants, nitrogen oxides are normally recovered as a nitrite/nitrate solution, which is used for fertilizer production. By employing these methods, current nitric acid producing plants are able to reduce NOx emissions in tail gas to less than 200 ppm.

It is known that adding supplemental oxygen can boost nitric acid production while controlling NOx emissions. Such addition of oxygen is described, for example, in U.S. Pat. Nos. 4,183,906; 4,183,906; 4,235,858; and 5,167,935; UK Patent No. 803211; and EP published Patent application Nos. 799794 and 808797. It is also described in Kongshaug, Extension of Nitric Acid Plant Capacity by Use of Oxygen, Nitric Acid Symposium (1981); and by Faried et al., Boosting Existing Nitric Acid Production, The Fertiliser Society (1986).

FIG. 2 is a further flow diagram, showing prior art techniques for adding supplemental oxygen to conventional nitric acid processes as described in the aforesaid European patent application EP 808797. In particular, supplemental oxygen may be added through line 30e to the ammonia converter, lines 30a and 30c to the cooler/condenser 10, line 30d to the absorption tower 15, line 30c to the ammonia converter 5, and/or line 30b to the bleacher 20.

While the oxygen can be added at several possible locations in the process, it must eventually be routed to the absorption tower. This allows secondary air to be rerouted to the converter (because nitric oxide can be oxidized using significantly less secondary air). Rerouting secondary air to the converter causes the total air flow to the converter to be increased. Because it is standard practice to keep the ammonia-to-air ratio constant, the ammonia flow is increased a corresponding amount, causing an overall increase in the amount of nitric acid produced.

Thus, it is highly advantageous to reroute secondary air to the converter to increase nitric acid production. However, to comply with environmental regulations this normally must be done without a corresponding increase in NOx emissions.

Maintaining NOx emissions at acceptable levels can be accomplished by direct oxygen injection, increasing the height of the absorption tower, raising plant pressure, or increasing the capacity of the tail gas treatment unit. It is also possible to add a separate stripping reactor, as shown e.g., in U.S. Pat. No. 4,062,928. However, direct oxygen injection, i.e., the addition of oxygen from a source that is separate from the primary and secondary air source, is advantageous because it involves a significantly lower capital expense. It has been determined, for example, that one ton of directly injected oxygen results in an increase of about one ton of nitric acid production, while maintaining NOx emissions at about the same levels. The increase in nitric acid is normally accomplished by rerouting secondary air from the bleacher to the converter (where a corresponding amount of ammonia can be added, as explained above).

However, it has been determined by the present inventors that rerouting secondary air from the bleacher can adversely affect color quality of the nitric acid. This is believed to be caused by the fact that substituting direct oxygen injection for secondary air in the bleacher reduces the amount of physical stripping of impurities that occurs. In particular, the loss of nitrogen (which is normally found in the secondary air but not in directly injected oxygen) reduces the amount of physical stripping that occurs.

Also, it would be advantageous to reduce the amount of supplemental oxygen required for direct oxygen injection, while maintaining the elevated nitric acid production level brought about by direct oxygen injection, and avoiding an increase in NOx emissions.

Methods of mixing gases, including oxygen, and liquids are described in U.S. Pat. Nos. 5,108,662; 5,356,600; 4,867,918; 5,061,406; 5,302,325; and 4,931,225. These patents do not disclose any practical advantage of these methods in mixing of gases and liquids in nitric acid production.

It is therefore an object of the present invention to allow an increase in the production of nitric acid, or a decrease in the amount of secondary oxygen supplied to a process for nitric acid production, while maintaining the color quality of the nitric acid produced, while maintaining NOx emissions at about the same levels, and without significant capital expenditure.

SUMMARY OF THE INVENTION

The present invention relates to an improvement in a process for producing nitric acid involving oxidizing ammonia gas to form dinitrogen tetroxide gas, reacting the dinitrogen tetroxide with water in an absorption zone to form aqueous nitric acid and nitric oxide gas, removing a nitric acid/nitric oxide stream from the absorption zone and feeding the stream into a nitric acid bleaching zone, removing impurities from the nitric acid in the bleaching zone to form nitric acid product and adding supplemental oxygen gas to one or more of the reaction streams to increase nitric acid production and or strength. The improvement involves injecting the supplemental oxygen into a nitric acid-containing process stream to form a gas bubble/liquid mixture in the stream, the mixture forming a fine dispersion of gas bubbles having diameters of less than about 0.1 mm. According to the method, increased interfacial surface is created between the gas bubbles and the liquid mixture.

The present inventors have determined that this method solves problems associated with prior art processes that are described above. For example, by employing the present method, it has been found that impurities present in aqueous nitric acid are substantially reduced. As a result, the color quality of the nitric acid is improved, and it is possible to redirect additional secondary air to the converter to increase nitric acid production, or decrease the amount of supplemental oxygen supplied to the system.

Furthermore, this is accomplished without an accompanying increase in NOx emissions, and without the need for capital intensive improvements that would otherwise be required to reduce such emissions.

In the conventional nitric acid production process shown in FIG. 1, about 85% of the air employed is directed to the converter, and about 15% is directed to the bleacher. By employing direct oxygen injection, e.g. as described in EP 808797, and in particular by directing supplemental oxygen to the cooler/condenser and bleacher through lines 30a and 30b as shown in FIG. 2, about one-half to one-third of the secondary air that would otherwise have been routed to the bleacher can be redirected to the converter. The resulting process might direct, for example, about 95% of the air as primary air 1a to the converter, and about 5% of the air as secondary air through line 1b to the bleacher.

It has been determined that, in such a process, employing the method of the invention can result in a decrease of from about 5 to 20% of the secondary air drawn through line 1b, with a corresponding amount being redirected to the converter. As a result, production of nitric acid can, if desired, be increased a corresponding amount. Rather then increase production, however, it is believed that it will normally be preferable to decrease the amount of supplemental oxygen employed. Use of the method of the invention can result in a decrease of between about 5 and 20% of the supplemental oxygen that would otherwise be directly injected using, for example, the method of EP 808797.

Without wishing to be bound by any theory of the invention, it is believed that the present invention functions to increase the rate of transfer of oxygen into the nitric acid in the liquid phase, thereby increasing the rate of reaction (13). Bleaching is then improved by removal of $HNO_2$ according to that reaction. It is also believed that the present invention functions by increasing transfer of impurities in liquid nitric acid to gaseous oxygen bubbles formed according to the method of the invention. The major impurity removed by this method is believed to be di-nitrogen tetroxide. Once the dinitrogen tetroxide is removed by this means, it is destroyed according to reactions (10) and (11) above. This is believed to also promote destruction of $HNO_2$ in the liquid phase by shifting the equilibrium of reaction (12).

It is also believed that increased destruction of $HNO_2$ by the mechanisms described above promotes destruction of $N_2O_4$ by shifting the equilibrium of reaction (11). Further, it is believed that increased destruction of $N_2O_3$ is caused by shifting of the equilibrium of reaction (16), and that increased destruction of $NO_2$ is caused by shifting of the equilibrium of reaction (18).

Destruction of $HNO_2$, $N_2O_4$, $N_2O_3$, and $NO_2$ from the liquid phase using the process of the invention substantially increases the color quality of nitric acid produced.

In part, the invention overcomes deficiencies of prior art processes using directly injected oxygen by increasing the amount of physical stripping. This compensates for the physical stripping that is lost when direct oxygen injection substitutes for secondary air. Physical stripping by practice of the method of the invention removes impurities into the gas phase (as opposed to reacting those impurities in the manner described above). The impurities are then carried back to the absorber in the gas phase (e.g., through line 17).

DETAILED DESCRIPTION OF THE INVENTION

All patent applications, patents, and literature references cited in this specification are hereby incorporated by reference in their entirety.

The method of the invention is carried out using an in-line gas dispersion device that is capable of forming bubbles having a diameter less than about 0.1 mm. The preferred device is an in-line sonic stripper, such as one which is commercially available from Praxair, Inc. and is described in U.S. Pat. No. 5,302,325. The in-line gas dispersion device of U.S. Pat. No. 5,302,325 is capable of accelerating a portion of a gas/liquid mixture to supersonic velocity and subsequently deaccelerating the mixture to subsonic velocity. Sonic shock waves are thus produced within the mixture, producing very fine gas bubbles having an enhanced interfacial surface between gas and liquid.

Figure 3:
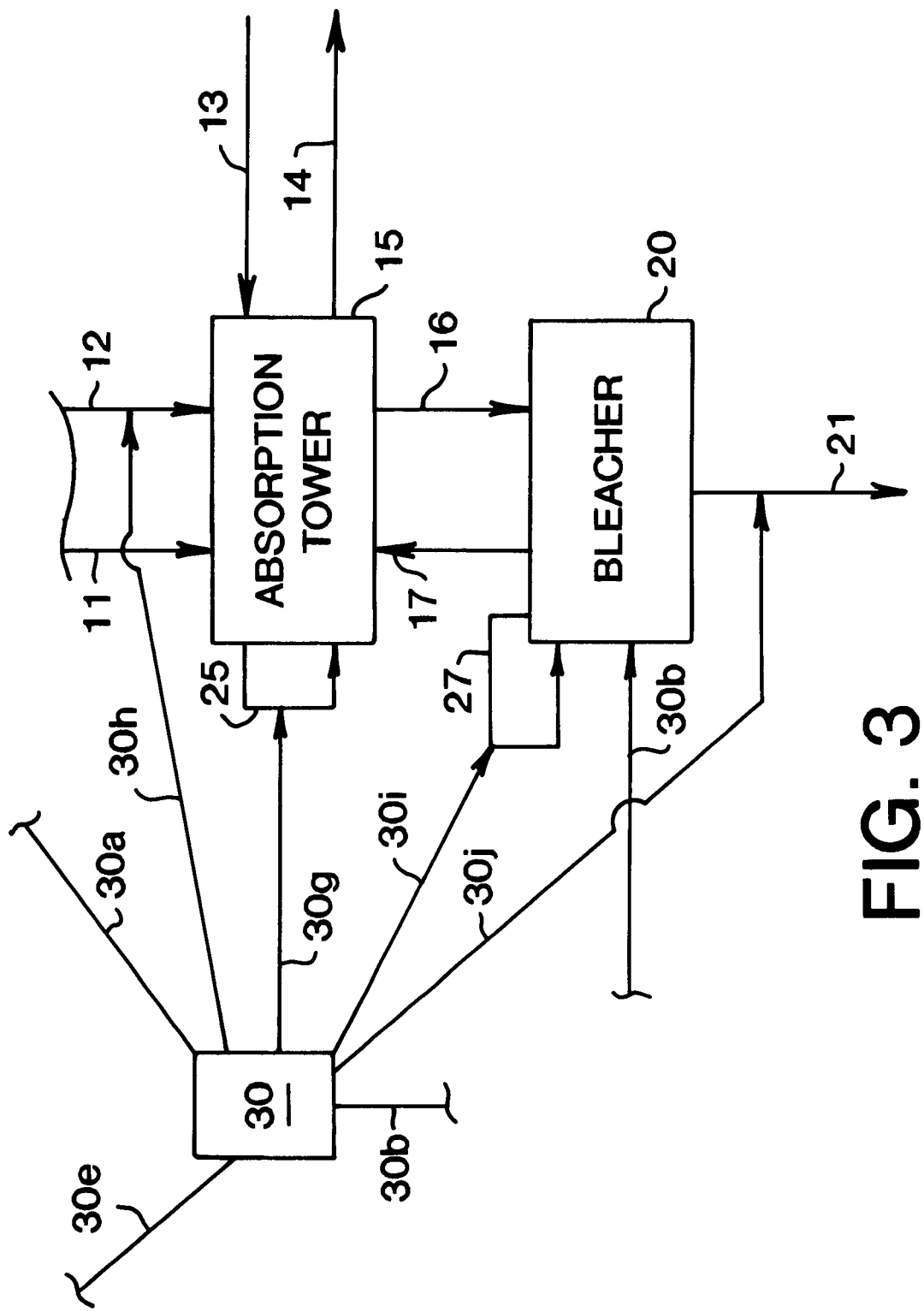
FIG. 3 is a partial schematic diagram of nitric acid manufacture depicting some of the places in the process at which oxygen can be injected employing the method of the invention.

Oxygen can be injected into aqueous nitric acid using the method of the invention anywhere there is such a stream in the production process, in particular anywhere between the cooler/condenser train 10 and the final product effluent 21, in order to achieve beneficial results by employing the present process. As shown in FIG. 3, there are several possible places at which oxygen may be injected employing the method of the invention. In the embodiments depicted, oxygen is injected into a line carrying aqueous nitric acid through one or more of oxygen carrying lines 30h, 30g, 30f, 30i, and 30j. The oxygen is injected to form a gas bubble/liquid mixture in the line carrying nitric acid to form a dispersion of gas bubbles having diameters of less than about 0.1 mm.

The oxygen may thus be injected via line 30g to line 25, which recycles nitric acid in the absorption tower 15. Such a recycle line would normally be situated at the bottom of the tower. Similarly, it is possible to inject the oxygen through line 30i to line 27, which recycles nitric acid in the bleacher 20. It is also possible to inject the oxygen through line 30h to line 12, carrying dilute nitric acid between the cooler/condenser 10 and the absorption tower 15. Finally, the oxygen may be injected through line 30j into the liquid effluent line 21 leaving the bleacher 20 containing nitric acid product.

Figure 4:
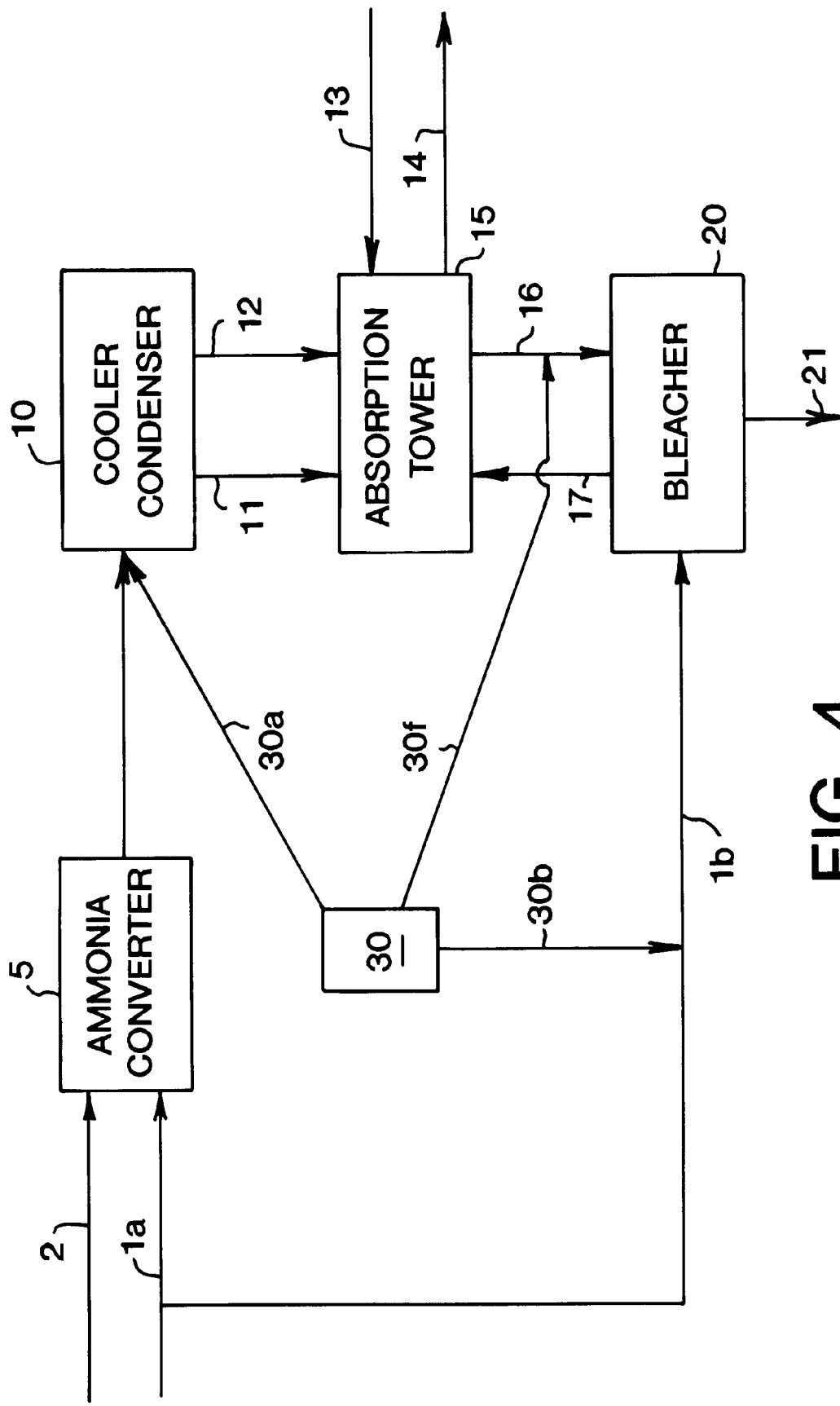
FIG. 4 is a schematic diagram of nitric acid manufacture depicting a preferred embodiment of the invention.

In a preferred embodiment of the invention, oxygen which is otherwise introduced into the cooler/condenser 10 or bleacher 20 is injected using the gas dispersion technique of the invention into the liquid aqueous nitric acid/nitric oxide gas stream produced in the absorption tower. More preferably, directly injected supplemental oxygen that is distributed entirely between the cooler/condenser and the bleacher as described in EP 808797 and in corresponding U.S. patent application Ser. No. 08/652,046, filed May 23, 1996 is partially redirected to an in-line gas dispersion device. In the preferred embodiment, shown in FIG. 4, an in-line gas dispersion device is placed in line 16 carrying aqueous nitric acid and nitric oxide gas from the absorber 15 to the bleacher 20 to inject the oxygen at that point. The oxygen is injected through line 30f from a supplemental oxygen source 30, that also supplies oxygen directly to both the condenser 10 and the bleacher 20 through lines 30a and 30b respectively. The oxygen directed through line 30f is preferably a portion, or even all, of the oxygen that would otherwise have been directed to the bleacher.

While the oxygen injected by the method of the invention is shown in FIGS. 3 as separate from other oxygen containing lines, i.e., as emanating directly from the supplemental oxygen source 30, it is advantageous under appropriate circumstances to redirect oxygen from a supplemental oxygen carrying line that conventionally injects oxygen, such as line 30a or line 30b. The oxygen is preferably redirected from line 30b carrying oxygen to the bleacher.

Figure 1:
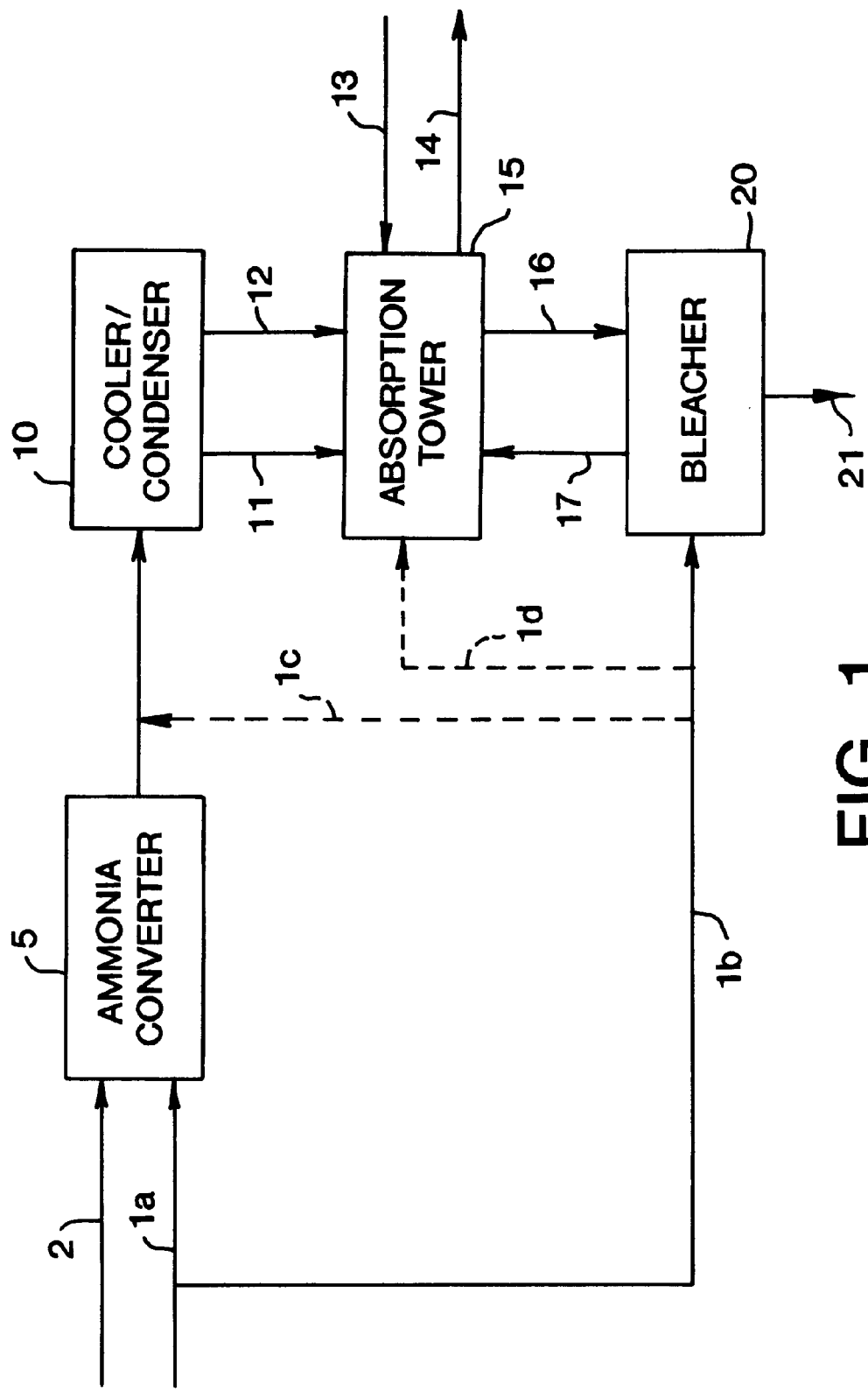
FIG. 1 is a schematic diagram depicting conventional prior art processes for manufacturing nitric acid without supplemental oxygen.
Figure 2:
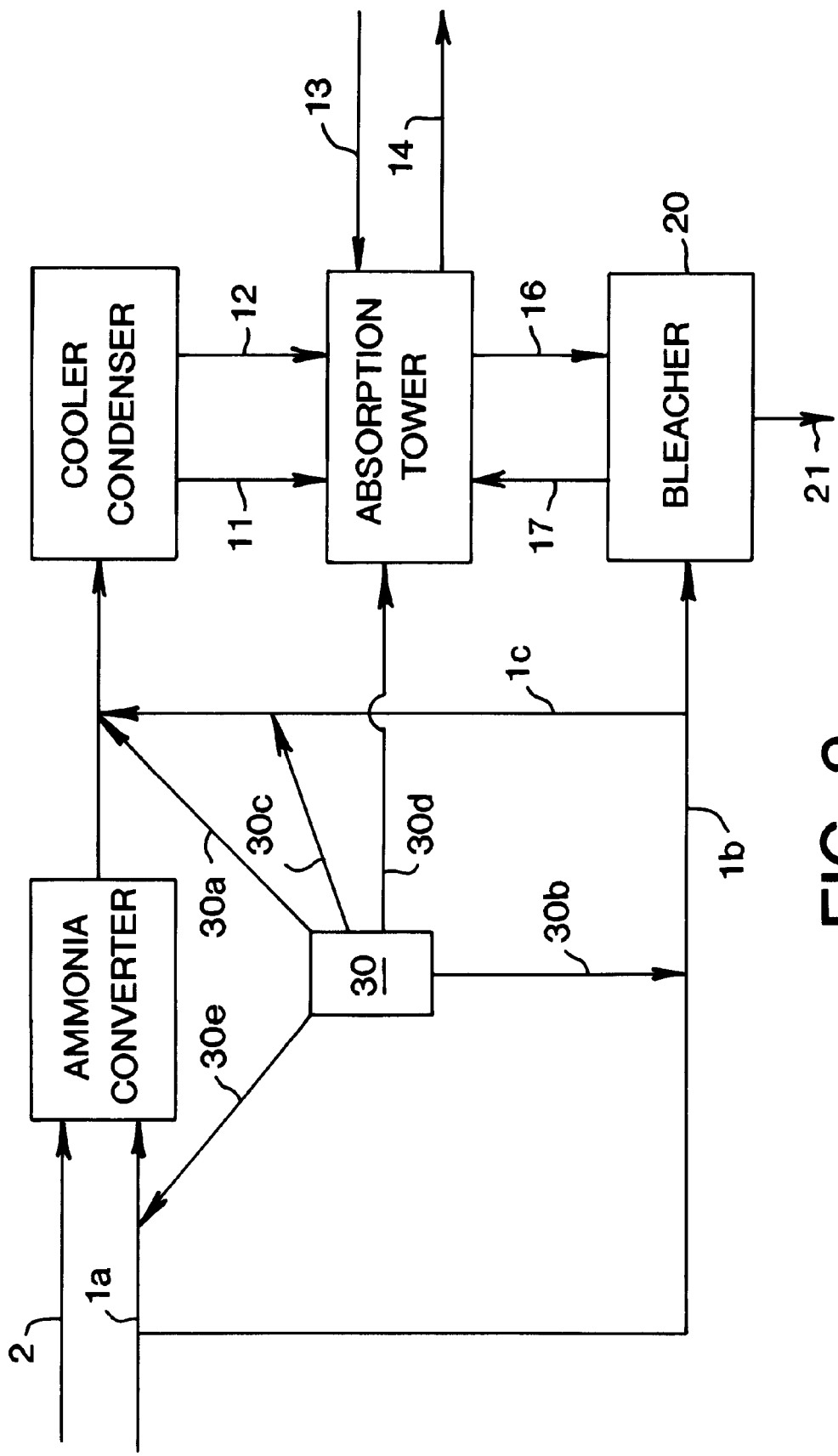
FIG. 2 is a schematic diagram depicting the prior art technique for injecting supplemental oxygen as described in European Published Application EP 808797. Various points at which the supplemental oxygen may be injected are shown.

It is within the scope of the invention to practice these methods in any process in which supplemental oxygen is injected into the nitric acid production process. Many such processes are known to those skilled in this art. Thus, the invention encompasses processes in which supplemental oxygen is supplied in any configuration desired to the converter, cooler/condenser, absorption tower and/or bleacher, including those described in the patents and other references cited in the Background of the Invention section above. It is, for example, within the scope of the invention to inject supplemental oxygen through several lines at once, for example through any of the lines shown in FIG. 2.

Any oxygen containing gas can be used to supply the supplemental oxygen, including air, oxygen-enriched air, and oxygen de-enriched air. It is within the scope of the invention, for example, to inject a portion of the secondary air using the method of the invention. This can be done to improve the bleaching qualities achieved with the secondary air. It is also within the scope of the invention to inject a portion of the tail gas, for example at any of the places at which oxygen is shown as being injected in FIG. 3.

It is within the scope of the invention to use one in-line injection device, or several. For example, it is within the scope of the invention to place two or three in-line gas dispersion devices in the line between the absorption unit and the bleacher that carries aqueous nitric acid and nitric oxide gas produced in the absorption tower. It is also within the scope of the invention to direct oxygen to in-line gas dispersion devices placed at several locations, e.g., any of the locations shown in FIGS. 3.

Existing plants can be easily retrofitted to carry out the process of the invention. This is done by adding the necessary oxygen supply line(s), and by inserting the in-line gas injection device, or devices, in any desired liquid containing line carrying nitric acid.

Preferably, the oxygen that is injected through the in-line device is as cold as is practicable, preferably at temperatures of about 0 to −20° C. Cold oxygen promotes the advantageous removal of impurities and dissolution of oxygen according to the invention.

While specific embodiments of the invention are described herein, alternate embodiments will be apparent to those skilled in this art which are intended to be included within the scope of the claims.

What is claimed is:

1. In a process for producing nitric acid by oxidizing ammonia gas to form dinitrogen tetroxide gas, reacting the dinitrogen tetroxide with water in an absorption zone to form aqueous nitric acid and nitric oxide gas, removing a nitric acid/nitric oxide stream from the absorption zone and feeding the stream into a nitric acid bleaching zone, removing impurities from the nitric acid in the bleaching zone to form nitric acid product and adding supplemental oxygen gas to one or more of the reaction streams to increase nitric acid production and/or strength, the improvement which comprises injecting the supplemental oxygen into a nitric acid-containing process stream to form a gas bubble/liquid mixture therein comprising a fine dispersion of gas bubbles having diameters of less than about 0.1 mm and thereby providing increased interfacial surface between the gas bubbles and the liquid mixture.

2. The process of claim 1 wherein the supplemental oxygen is injected into the nitric acid-containing process stream removed from the absorption zone and fed into the bleaching zone to increase the mass transfer rate of oxygen into the nitric acid and of impurities into the oxygen gas bubbles, and thereby increase stripping and reaction of by-products from the liquid stream and also thereby shift the reaction equilibria therein.

3. The process of claim 1 wherein the supplemental oxygen is injected into:
   (a) a stream recycling nitric acid in the absorption zone;
   (b) a stream recycling nitric acid in the bleaching zone; or
   (c) a nitric acid effluent stream removed from the bleaching zone.

4. The process of claim 1 wherein the supplemental oxygen is drawn from a secondary air stream providing air to the bleaching zone, or a tail gas stream venting from the absorption zone.

5. In a process for producing nitric acid by oxidizing ammonia gas with air to form gaseous nitric oxide and water vapor, oxidizing the nitric oxide with air to form nitrogen dioxide gas, dimerizing the nitrogen dioxide gas to form dinitrogen tetroxide gas, reacting the dinitrogen tetroxide with water in an absorption zone to form aqueous nitric acid and nitric oxide gas, removing a nitric acid/nitric oxide stream from the absorption zone and feeding the stream into a nitric acid bleaching zone, removing impurities from the nitric acid in the bleaching zone to form nitric acid product and adding supplemental oxygen gas to one or more of the reaction streams to increase nitric acid production and/or strength, the improvement which comprises injecting the supplemental oxygen into the nitric acid-containing process stream removed from the absorption zone and fed into the bleaching zone to form a gas bubble/liquid mixture therein comprising a fine dispersion of gas bubbles having diameters of less than about 0.1 mm and providing increased interfacial surface between the gas bubbles and the liquid mixture to facilitate removal of impurities from the nitric acid-containing process stream.

6. The process of claim 5 wherein the supplemental oxygen is drawn from a secondary air stream providing air to the bleaching zone, or a tail gas stream venting from the absorption zone.

7. In a process for producing nitric acid by oxidizing ammonia gas with air to form gaseous nitric oxide and water vapor, oxidizing the nitric oxide with air to form nitrogen dioxide gas, dimerizing the nitrogen dioxide gas to form dinitrogen tetroxide gas, reacting the dinitrogen tetroxide with water in an absorption zone to form aqueous nitric acid and nitric oxide gas, removing a nitric acid/nitric oxide stream from the absorption zone and feeding the stream into a nitric acid bleaching zone, removing impurities from the nitric acid in the bleaching zone to form nitric acid product and adding supplemental oxygen gas to one or more of the reaction streams to increase nitric acid production and/or strength, the improvement which comprises injecting the supplemental oxygen into the nitric acid-containing process stream removed from the absorption zone and fed into the bleaching zone to form a gas bubble/liquid mixture therein, accelerating a substantial proportion of the gas bubble/liquid mixture to a supersonic velocity and decelerating the gas bubble/liquid mixture to a subsonic velocity to create a sonic shock wave forming a fine dispersion of gas bubbles having diameters of less than 0.1 mm and providing increased interfacial surface between the gas bubbles and the nitric acid in the process stream to facilitate increased mass transfer between the gas and liquid phases of the process stream.

* * * * *